H. C. WHITE.
STEREOSCOPE OR OTHER BINOCULAR INSTRUMENT.
No. 11,638. Reissued Nov. 16, 1897.
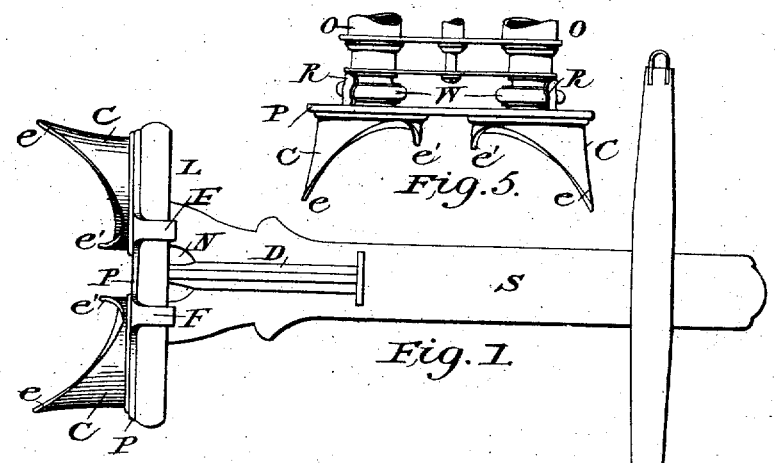
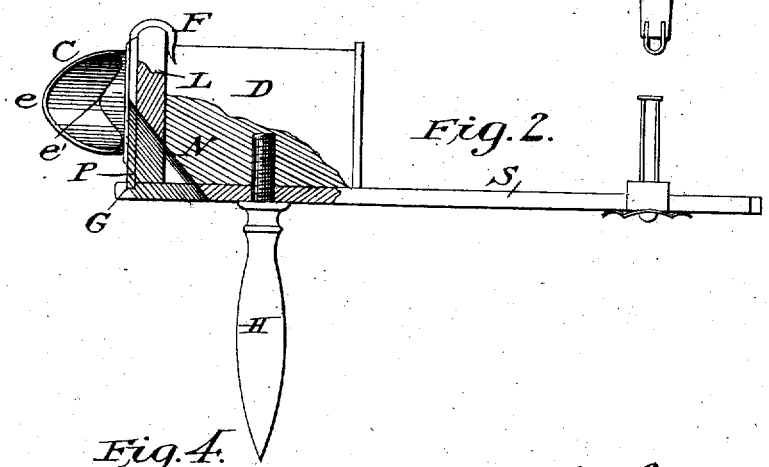
Fig. 4.
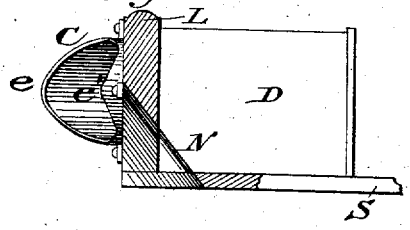
Fig. 3.
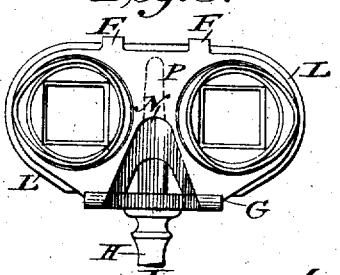
Witnesses.
Charles H. Houghton
Geo. F. Houghton.
Inventor.
Hawley C. White,
by Franklin Scott, Atty.
THE NORRIS PETERS CO., WASHINGTON, D. C.

UNITED STATES PATENT OFFICE.

HAWLEY C. WHITE, OF NORTH BENNINGTON, VERMONT, ASSIGNOR TO THE H. C. WHITE COMPANY, OF SAME PLACE.

STEREOSCOPE OR OTHER BINOCULAR INSTRUMENT.

SPECIFICATION forming part of Reissued Letters Patent No. 11,638, dated November 16, 1897.

Original No. 571,716, dated November 17, 1896. Application for reissue filed February 13, 1897. Serial No. 623,324.

*To all whom it may concern:*

Be it known that I, HAWLEY C. WHITE, manufacturer, of North Bennington, in the county of Bennington and State of Vermont, have invented certain new and useful Improvements in Stereoscopes and other Binocular Instruments, of which invention the subjoined description, in connection with the accompanying drawings, constitutes a specification.

This invention relates to means connected with or capable of being attached to such instruments as stereoscopes, opera and field glasses, and similar instruments which afford provisions for resting the instrument against some part of the face of the observer and at the same time furnish a perfect separate shield for each eye and which shall thus form a dark chamber for each eye.

The invention is fully shown in the drawings, wherein—

Figure 1 is a plan view of an ordinary stereoscope with my improvement applied thereto as a separable attachment. Fig. 2 is a side elevation in part and in part a vertical longitudinal section of the object shown in Fig. 1. Fig. 3 is a front end view of the scope shown in Fig. 1. Fig. 4 is a similar view of a scope having my improvement applied thereto as a constituent part of the structure. Fig. 5 shows my invention as a separable attachment applied to an ordinary opera-glass.

Such instruments as stereoscopes have heretofore been supplied with a screen for the eyes which has been attached to the lens-holder and has been partially or wholly fitted to the shape of the forehead and cheeks of the human face, so as to partially or wholly exclude extraneous light from outside the instrument from the eyes. As such instruments have been constructed it has been found difficult to so shape the edge of the hood that it will fairly fit all faces with that degree of perfection requisite to effect complete exclusion of light from the chamber within the hood. Another objection which exists to a hood which embraces both lenses and eyes in a single chamber is the fact that it cannot be well fitted to the face and bring the eyes of the user close to the lenses. With the most approved styles the distance between the eyes and the lenses varies from one and one-half to two inches. As it is desirable in order to secure the best view of the objects seen through the lenses to have the eyes brought into as close proximity to the lenses as possible the subject-matter of this patent has been devised, which is designed to accommodate itself to the vision of every person.

The invention consists of a pair of tubular shields C C, which are adapted to fit the rims of the eye-sockets. Each of these shields has an extension *e*, which extends rearwardly and covers the outer corner of the eye and bears against the temple of the face. Another projection *e'* extends inwardly on the inside of the nose against the inner corner of the eye. The upper edge of the shield conforms to the shape of the arch of the eyebrow, while its under edge fits the shape of the cheek-bone beneath the eye. These shields are so shaped that when applied to the face they will make close contact therewith about each eye and effectually obstruct the admission of extraneous light to the interior of the eye-chamber.

As an additional provision for bringing the eyes up closely to the lenses a liberal gap N is made in the shaft S, lens-frame L, and division-piece D, which gap is a novel feature in stereoscopes. This gap permits the use of a hood of much narrower dimensions than those in common use in that class of stereoscopes in which a hood is used, and thus greatly increases the efficiency of scopes provided with properly-shaped hoods as well as those provided with independent eyepieces.

The lenses of the stereoscope are set in the lens-frame L, Figs. 2 and 4, in the ordinary way. As the construction of the lens-frame, shaft, picture-holder, and division-piece may be according to any suitable design it is not here described, as it is considered immaterial, provided the lens-frame is equipped with the duplicate eye-shields, either as a permanent attachment or a detachable fixture, and the framework is notched for the nose, as shown.

As the leading and most important characteristic of my invention is the projection *e'*, which extends inwardly alongside of the nose to exclude light which otherwise would find admission to the eye, and which is equally applicable to monocular and binocular optical instruments, I regard this as a distinctive element of invention and claim that any hood or shield for the eyes, or either of them, which has this particular feature as falling within the scope of the invention.

As one method of carrying out my invention of supplying binocular instruments with the described eye-shields I provide a flat plate P, which is perforated within the seat of the eye-shields C C, as seen in Fig. 3, and is provided with the grappling clips or hooks F F for attachment to a stereoscope, as seen in Fig. 1, or R R for attachment to the lens-pieces W of an opera-glass, as seen in Fig. 5. In the first instance the plate P is slipped into position over the lens-frame, the hooks F F catching onto or over the edge of the lens-frame L of the stereoscope. The lower edge of the plate finds a seat in the transverse slot G, provided therefor in the end of the shaft S. In the latter case the plate P is provided with a sufficient number of the grappling spring-clips R R to firmly attach it to the eyepieces of the opera or field glass. Hence

I claim as my invention and desire to secure by Letters Patent—

1. An eyepiece for stereoscopes and other optical instruments consisting of a tubular piece having the end which contacts with the user's face fitted to the orbit of the eye by having an outer projection fitted to the temple and an inner projection fitted to enter the sunken depression at the inner corner of the eye beside the nose.

2. An eyepiece for stereoscopes and other optical instruments, consisting of a piece having the part which contacts with the user's face fitted to the orbit of the eye by having an inner projection fitted to enter the sunken depression at the inner corner of the eye beside the nose.

3. A stereoscope fitted with tubular eyepieces for the eyes, each having an outer projection fitted to the temple and an inner projection fitted to enter the sunken depression at the inner corner of the eye, whereby a dark chamber for each eye is obtained in use.

4. A stereoscope in which the means employed for excluding light from the eyes embrace in combination an inner projection or shield fitted to enter the sunken depression at the inner corner of the eye beside the nose.

In testimony whereof I have hereto subscribed my name, at North Bennington, Vermont, December 16, 1896.

HAWLEY C. WHITE.

Witnesses:
FRANKLIN SCOTT,
EMILY SCOTT.